No. 651,493. Patented June 12, 1900.
J. G. OXNARD & W. BAUR.
CENTRIFUGAL.
(Application filed June 18, 1897.)
(No Model.) 2 Sheets—Sheet 1.

WITNESSES
INVENTORS
James G. Oxnard
Wilhelm Baur.
by P. Walter Fowler
Attorney

No. 651,493. Patented June 12, 1900.
J. G. OXNARD & W. BAUR.
CENTRIFUGAL.
(Application filed June 18, 1897.)

(No Model.) 2 Sheets—Sheet 2.

WITNESSES
Chapman N Fowler
Lawrence B. Muzzy

INVENTORS
James G Oxnard.
Wilhelm Baur.
by T. Walter Fowler, Attorney

UNITED STATES PATENT OFFICE.

JAMES G. OXNARD AND WILHELM BAUR, OF NEW YORK, N. Y., ASSIGNORS TO THE OXNARD CONSTRUCTION COMPANY, OF WEST VIRGINIA.

CENTRIFUGAL.

SPECIFICATION forming part of Letters Patent No. 651,493, dated June 12, 1900.

Application filed June 18, 1897. Serial No. 641,307. (No model.)

*To all whom it may concern:*

Be it known that we, JAMES G. OXNARD, a citizen of the United States, and WILHELM BAUR, a subject of the Emperor of Germany, both residents of New York, in the county of New York and State of New York, have invented certain new and useful Improvements in Centrifugals, of which the following is a specification, reference being had therein to the accompanying drawings.

Our invention relates to that class of machines known as "centrifugals" and which are used in the manufacture of sugar for extracting from the masse-cuites the green and wash syrups; and our invention consists of the parts and the constructions and combinations of parts, which I shall hereinafter fully describe and claim.

Figure 1:
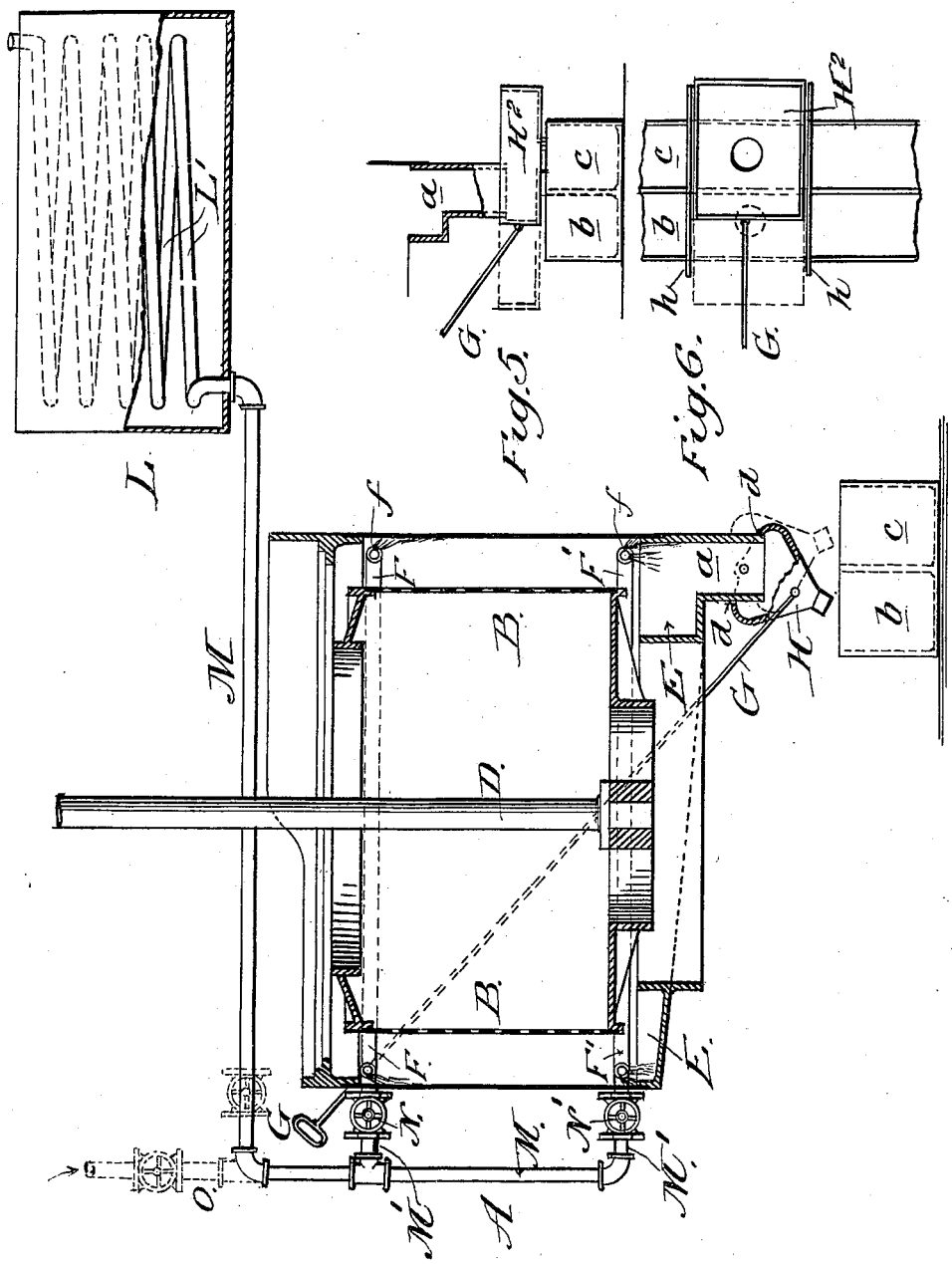
Figure 2:
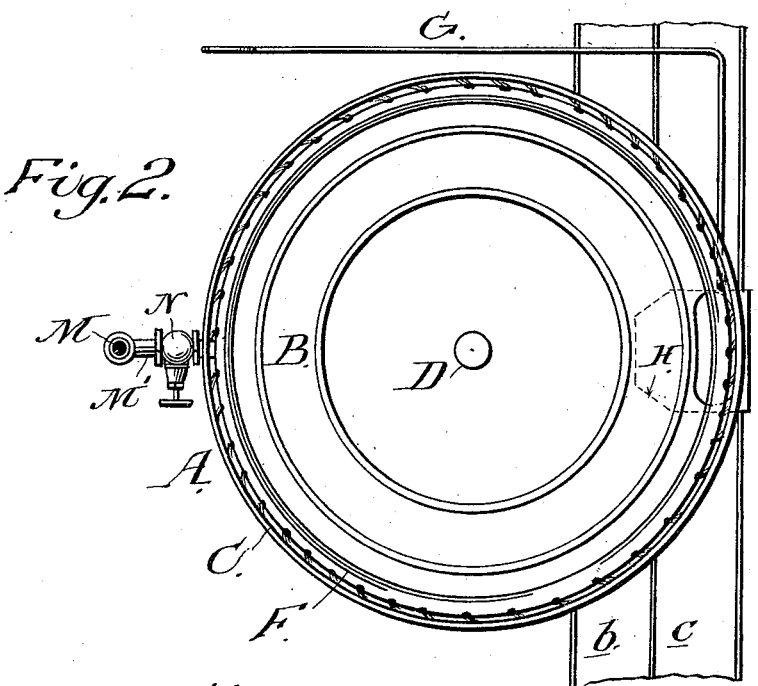
Figure 7:
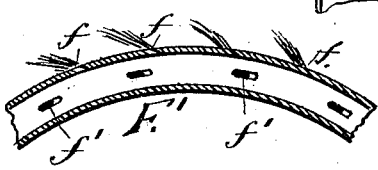
Figure 3:
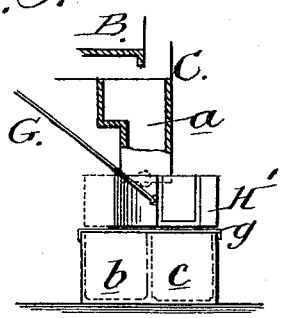
Figure 4:
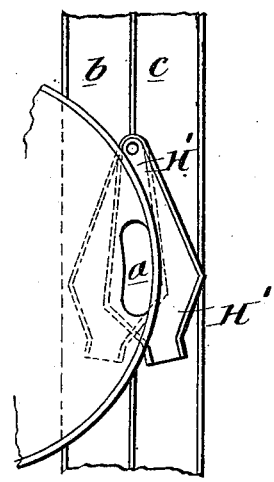

Referring to the accompanying drawings, in which similar letters of reference indicate corresponding parts, Figure 1 represents a vertical sectional view of a centrifugal embodying our invention and showing in connection therewith a condenser whereby hot water, wet steam, and dry steam may be successively injected into the centrifugal to cleanse the outer basket and collecting-gutter thereof of adhering syrups. Fig. 2 is a top plan view of Fig. 1. Fig. 3 is an enlarged sectional detail of a part of the centrifugal and its collecting-gutter, showing another form of movable nozzle or gate. Fig. 4 is a plan view of Fig. 3. Fig. 5 is a sectional detail, and Fig. 6 is a plan view, of still another form of movable nozzle or gate. Fig. 7 is a detail of a section of pipe F'.

In the manufacture of sugar the juice which has been clarified and concentrated in any well-known manner is boiled in vacuum-pans for masse-cuite and is then dropped into a mixer and cooled and discharged into the centrifugal A, where its syrups are spun off and washed either with steam or hot water until the sugar remaining in the centrifugal will have the desired color and standard of purity.

The centrifugal A consists, essentially, of an inner revoluble vessel or basket B, of foraminous material, and a stationary outer vessel or basket C, said inner vessel or basket being suitably fixed to a vertical shaft D, to which power is applied from a suitable source to rotate the inner vessel or basket at the desired speed. Around the bottom of the stationary outer vessel or basket C is formed a gutter, trough, or channel E, in which the green and wash syrups coming from the centrifugal are collected and finally discharged through a spout or nozzle $a$ at the lowest point of the gutter.

The construction thus far described is substantially the well-known form of centrifugal used in the manufacture of sugar, and to the same the following improvements are made: Circumscribing the centrifugal and within the space between the inner and outer vessels or baskets and located near the upper and lower portions of said vessels or baskets are the coils F F', said coils having inclined perforations $f$ made in them at such an angle that the jets of water or steam discharged through the perforations will strike the inner wall of the outer vessel or basket and the side wall of the collecting-gutter at an inclination so as to thoroughly and quickly cleanse said walls of their adhering syrups. The lower coil F' may also have a series of inclined perforations $f'$ in its bottom to assist the washing action and to act more particularly on the bottom wall or floor of the collecting-gutter. These perforations enable the water or steam jets to thoroughly cleanse the inner wall and gutter of the outer vessel or basket and to direct the wash syrups to the outlet or nozzle $a$.

In order that the various syrups coming from the centrifugal may be directed into different channels or receptacles and thereby maintained separate from each other, we use a movable nozzle, which is interposed between the nozzle or spout $a$ of the centrifugal and the underlying separate channels or receptacles $b$ $c$, so that when the masse-cuite is dropped into the centrifugal, of which the inner wall of the outer vessel or basket has been previously washed of any adhering syrups, the machine is run to extract by centrifugal action the green syrups, said syrups will be directed down the inner walls of the outer vessel or basket into the gutter at the bottom and will discharge through the nozzle or spout $a$. These syrups then pass into a movable nozzle, of which several forms are shown in the drawings, and from this movable nozzle they are directed into their own channel or receptacle b beneath, the said movable nozzle discharging directly into this channel or receptacle and the syrup thus collected for subsequent treatment.

When the operator discovers that green syrup has ceased coming from the centrifugal, he will grasp the rod or handle G, which is connected with the movable nozzle and extends within appropriate reach of the operator and move the nozzle from its former position into a position in which its discharge end will lie in line with the other channel or receptacle c, so that the subsequent wash syrup may be directed into this channel or receptacle and maintained separate from the previously-collected green syrups.

In Fig. 1 the movable nozzle H is shown as of a funnel or truncated shape, its upper portion being open and receiving into it the nozzle or spout a of the centrifugal, and said movable nozzle in this instance is pivotally secured to the fixed nozzle, so that its lower or discharge end may be swung from one underlying channel or receptacle to the other, according to the kind or grade of syrup coming from the centrifugal. By the arrangement described the position of the movable nozzle is quickly changed, and the throw of the same in either direction is limited by the inner edges d of the top opening of the movable nozzle contacting with the outer walls of the nozzle a, as shown.

In Figs. 3 and 4 the movable nozzle H' is horizontally disposed and is pivotally secured at one end portion. It has a contracted discharge end, and it swings in horizontal planes in the space between the fixed nozzle a and the channels or receptacles beneath, and its inner side walls contact with the nozzle a to limit the movement of the movable nozzle in either position indicated, being supported in its movements, if desired, by means of a plate or support g, fixed on the receptacles beneath.

In Fig. 5 the movable gate or nozzle H² slides back and forth in horizontal planes between suitable guides h, and in each of the instances mentioned the position of this nozzle or gate is adjusted by the operator's manipulation of the rod or handle G.

The centrifugal is preferably used in connection with a condenser consisting of a water box or tank L, having a coil L', the inlet end of which is in communication with a boiler, while the outlet end terminates in a pipe M, which leads to and connects with the perforated coils F F' of the centrifugal, suitable valves N N' being let into the branches M' of the pipe M to control the admission of hot water or steam to the pipes F F'.

When the green syrups cease running from the centrifugal, as before mentioned, and the operator has moved the movable nozzle or gate into such a position that it will discharge into the channel or receptacle c, the steam is turned on to wash the inner walls of the outer basket and the collecting-gutter E of adhering syrups. The first effect of this turning on of the steam will be to drive out the coil L' the hot water which has condensed therein, and this water first attacks the syrup which is adhering to the walls of the outer vessel or basket and the collecting-gutter. The water being thus driven out of the coil L', the inrushing steam takes up any remaining moisture in the coil and discharges it in the form of wet steam into the coil F F', only to be succeeded by an injection of dry steam. Thus the inner wall of the vessel C and the collecting-gutter E thereof are successively and progressively washed by injections of hot water, wet steam, and dry steam, thereby insuring a complete and thorough cleansing of the centrifugal and the collecting, separate and distinct from the previously-extracted green syrups, of the washed syrups of the centrifugal, allowing these different syrups to be separately treated without a subsequent separation.

If desired, steam or hot water may be injected directly into the coils F F' through the medium of the valve-controlled pipe O. (Shown in dotted lines in Fig. 1.)

Having thus described our invention, what we claim as new, and desire to secure by Letters Patent, is—

1. In a centrifugal, the outer basket having an inclined collecting-gutter at its lower portion, a movable nozzle communicating with the gutter, and an inner basket and means for rotating the same, in combination with means for washing the inner walls of the outer vessel and also the collecting-gutter of adhering syrup, consisting of a pipe in both the upper and lower portions of the outer vessel, said pipes each having a series of perforations arranged tangentially and adapted to admit the cleansing medium against the inner walls of the outer vessel and the collecting-gutter at an angle, and said lower pipe having an additional series of perforations in its lower portion also tangentially arranged and adapted to admit the cleansing medium at an angle directly against the floor of the gutter, a hot-water and steam pipe and valve-controlled branches leading therefrom and connecting with the perforated pipes.

2. In a centrifugal and in combination with its inner and outer vessels and collecting-gutter, a pipe in the lower portion of the outer vessel contiguous to the collecting-gutter thereof, having perforations in its side adapted to inject a cleansing medium at an inclination directly against the inner side of the outer wall of the gutter and having other perforations in its bottom adapted to inject said cleansing medium at an inclination directly against the bottom or floor of the gutter whereby said gutter is cleansed of its adhering syrup, and means for admitting the cleansing medium to said pipe.

3. In a centrifugal and in combination with an inner rotatable vessel and an outer vessel or basket having an inclined collecting-gutter at its base, and provided with a discharge-nozzle, the perforated pipe near the upper part of the outer vessel and a similar pipe in the lower portion thereof, contiguous to the gutter, said pipes having their perforations inclined and adapted to direct a cleansing medium at an angle against the inner walls of the outer vessel and the gutter, and said lower pipe having a second series of inclined perforations in its under side adapted to discharge at an angle against the bottom or floor of the gutter, a movable nozzle for directing the outflow of the syrups into different channels, a condenser consisting of a water-box or tank and a coil, adapted to be connected with a boiler, and valve-controlled pipes leading therefrom and connected with the perforated pipes whereby hot water, wet steam and dry steam may be successively admitted to the perforated pipes.

In testimony whereof we affix our signatures in presence of two witnesses.

JAMES G. OXNARD.
WILHELM BAUR.

Witnesses:
DENNIS WM. WOOD,
GEO. DAN REIN.